US009358777B2

(12) United States Patent
Ihme et al.

(10) Patent No.: US 9,358,777 B2
(45) Date of Patent: Jun. 7, 2016

(54) LANGUAGE AND METHOD FOR MEASURING THE VISCOSITY OF PRINTING INK DURING THE PRINTING AND INK CORRECTION PROCESS

(71) Applicants: Windmoeller & Hoelscher KG, Lengerich (DE); X-Rite Europe AG, Regensdorf (CH)

(72) Inventors: Andreas Ihme, Lengerich (DE); Frank Twiehaus, Westerkappeln (DE); Martin Flaspoehler, Georgsmarienhuette (DE); Hendrik Tepe, Lienen (DE); Frank Dirksmeier, Tecklenburg (DE)

(73) Assignees: WINDMOELLER & HOELSCHER KG, Lengerich (DE); X-RITE SWITZERLAND GMBH, Regensdorf (CH)

( * ) Notice: Subject to any disclaimer, the term of this patent is extended or adjusted under 35 U.S.C. 154(b) by 0 days.

(21) Appl. No.: 14/199,104

(22) Filed: Mar. 6, 2014

(65) Prior Publication Data

US 2014/0182467 A1 Jul. 3, 2014

Related U.S. Application Data

(62) Division of application No. 12/734,977, filed as application No. PCT/EP2008/010389 on Dec. 8, 2008, now Pat. No. 8,708,439.

(30) Foreign Application Priority Data

| | | |
|---|---|---|
| Dec. 6, 2007 | (DE) | 10 2007 059 175 |
| Dec. 6, 2007 | (DE) | 10 2007 059 176 |
| Dec. 6, 2007 | (DE) | 10 2007 059 177 |
| Feb. 8, 2008 | (WO) | PCT/EP2008/000992 |

(51) Int. Cl.

| | |
|---|---|
| ***G01D 11/00*** | (2006.01) |
| ***B41F 1/40*** | (2006.01) |
| ***B41F 31/00*** | (2006.01) |
| ***B01F 13/10*** | (2006.01) |
| ***B41F 33/00*** | (2006.01) |

(52) U.S. Cl.

CPC ........... *B41F 31/005* (2013.01); *B01F 13/1055* (2013.01); *B01F 13/1072* (2013.01); *B41F 33/0045* (2013.01)

(58) Field of Classification Search

CPC ............. B01F 13/1055; B01F 13/1072; B41F 33/0045; B41F 31/005

USPC ......... 347/6, 7, 19, 84, 85, 100; 101/202, 211

See application file for complete search history.

(56) References Cited

U.S. PATENT DOCUMENTS

| | | | |
|---|---|---|---|
| 4,852,604 | A | 8/1989 | Wales et al. |
| 6,619,206 | B2 | 9/2003 | Koehler |
| 2011/0035040 | A1 | 2/2011 | Ihme et al. |

FOREIGN PATENT DOCUMENTS

| | | |
|---|---|---|
| DE | 2410753 | 9/1975 |
| EP | 0228347 | 7/1987 |

(Continued)

*Primary Examiner* — An Do

(74) *Attorney, Agent, or Firm* — Jacobson Holman, PLLC.

(57) ABSTRACT

A system for measuring the viscosity of printing ink during a printing and ink correction process includes a printing press having an ink supply system, and an optical measuring device for measuring actual optical values of light that has interacted with at least parts of the printing picture. The printing press has an ink mass determination device to determine the weight of at least parts of the ink located in the ink supply system, and a control and evaluation device to receive measured values from the optical measuring device and from the ink mass determination device. The control and evaluation device determines an optical deviation, and, based on the optical deviation and the values from the weighing devices, an amount of corrective ink that is to be fed to the printing press in order to approximate the actual optical values to optical reference values.

20 Claims, 12 Drawing Sheets

(56) References Cited

FOREIGN PATENT DOCUMENTS

Figure 1:
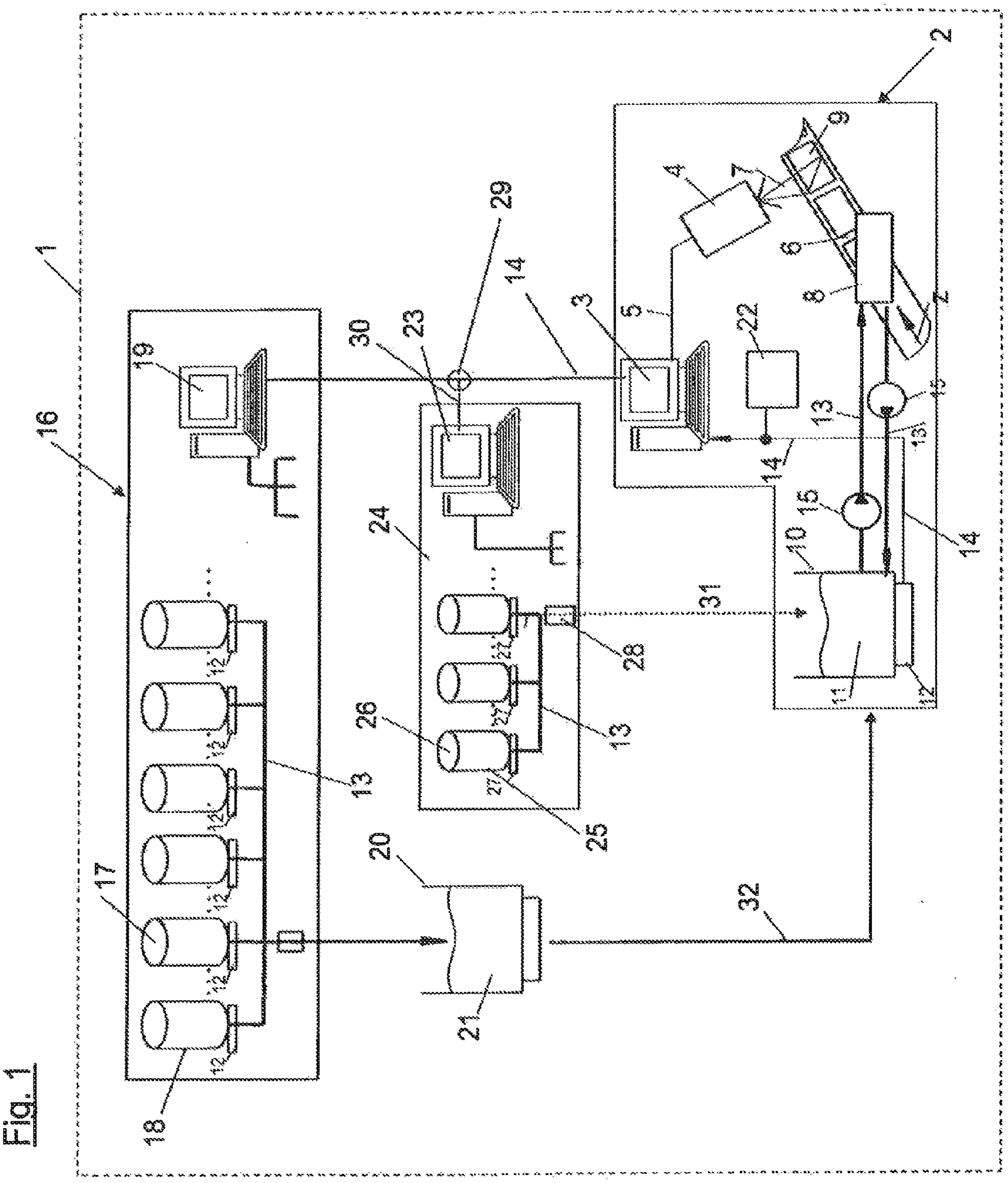

| | | | |
|---|---|---|---|
| EP | 1245387 A2 * | 10/2002 | |
| FR | 2355657 | 1/1978 | |
| GB | 2142448 | 1/1985 | |
| WO | WO 03/047865 | 6/2003 | |
| WO | WO 2007110764 A2 * | 10/2007 | |

* cited by examiner

LANGUAGE AND METHOD FOR MEASURING THE VISCOSITY OF PRINTING INK DURING THE PRINTING AND INK CORRECTION PROCESS

CROSS-REFERENCE TO RELATED APPLICATIONS

This application is a divisional application of U.S. application Ser. No. 12/734,977, filed Sep. 13, 2010, now allowed, the disclosure of which is incorporated by reference as if fully set forth herein. The aforementioned U.S. application Ser. No. 12/734,977 is a nationalization of PCT/EP08/10389 filed Dec. 8, 2008, and published in English.

The invention relates to a method for the control of the chemical composition of a colour mixture at at least one printing press, a mixing device for an ink mixture as well as a system for the control of the chemical composition of the ink mixture at at least one printing press as well as an apparatus and a method for the determination of the ink mass and the viscosity at a printing press for colour control as well as a method and a system for the extrapolation of densitometric measured values in not measured wavelength ranges at a printing press.

In printing presses printing ink is used which usually consists of different chemical components.

In most cases pigments, for example organic chromophores, which absorb wavelength ranges of the light and consist of a combination of carbon, oxygen and nitrogen and which are printed on a substrate such as a web, are decisive for the colour impression of the human viewer. The colour impression can be influenced or provided also by polymers. Among them the so called long chain hydrocarbons are the most important ones. The polymer chain contains chromophore groups, which are decisive for the required colour impression, after the cross-linking process of the polymers.

In many printing inks several of these colouring materials are included. Hence the colour impression of the viewer of a printing picture printed with such an ink is affected by several optically active components. The printing substrate and the solvent of the ink, which provides the main part of the volume of the ink, have additional influence on the colour impression of the viewer.

According to the state of the art the chemical composition of printing ink is determined in central facilities ("ink kitchen") of printing plants. The ink is usually mixed according to so-called ink formulas, which indicate the ink composition. After the initial mixing process the ink is brought to ink reservoirs of printing presses. The printing presses print with the ink.

It is also known how to take different kinds of measurements which concern the printing pictures. For example optical measuring instruments, which the person skilled in the art calls "densitometer" or "spectral-photometer", analyze light, which has interacted with the printing picture. The interaction between light and substrate usually comprises a reflection or a transmission of the light. Light which interacted with the printing picture (above all reflection or transmission are relevant in connection with the present disclosure) is called "remitted light" in the present publication.

Densitometers as well as spectral-photometers measure the intensity of light L (the remitted light) in a certain or respective spectral region. In the case of a "densitometrical" measurement different narrower spectral regions of the visible light (e.g. nine spectral regions) are measured. In most cases there are unmeasured gaps (spectral regions without measurements) between these narrower spectral regions.

The densitometer comprises several colour filters, which limit the light spectrum to a printed colour relevant for the measurement. Usually, four colour filters for the printing colours cyan, magenta, yellow and black are used. Behind each colour filter there is a photoelectric sensor (photodiode). The densitometer is used mainly for quantitative measurements of the colour density (full tone density). During the measurement light is radiated on a printed area and the remission and/or transmission value of the light is measured often with a photoelectric sensor (photodiode) after passing a colour filter. The measured values are used to detect optical deviations of the printed measuring area from a "colour standard". Among the optical features monitored are colour deviation, colour depth of shade, contrast etc.

The more significant "spectrometric" measurement usually contains measured values which cover the whole spectrum of visible light. This broad spectral region is measured for example by 36 sensors with narrower spectral ranges.

Hence, the corresponding sensor, the spectral-photometer, has the capacity to measure remission values of light in a spectral region which covers the whole spectrum of the visible light. The respective light has been reflected by the measuring area (usually a printed substrate). Usually the measuring area is lit up with suitable—in this case white—light.

Thus, the spectral-photometer measures the remission degree of the sample (in percent) over the visible spectral range of the light (approx. 400 to 800 nm). Usually, the measured values are used to calculate the coordinates of the measured colour in a colour space with a suitable software. The coordinates define the so-called chromaticity coordinates of the colour.

The EP 0 228 347 A1 shows a method for the closed loop control of the ink composition without measuring the ink viscosity. This causes error in the colour impression after a long printing time.

The objective of the present invention is to suggest a system and a method for measuring the viscosity of the printing ink during the printing and ink correction process.

This objective is attained with the invention described herein.

The patent application EP 0,228,347 A1 discloses a control method for the colour transfer onto a printing substrate, which uses densitometrical colour measurement instead of a spectral colour analysis. Measuring the spectral distribution of the colour permits a very precise computation of corrective measures with regard to the basis recipe of the ink. In this context a suitable software can be used.

Measurements with a spectral-photometer are time consuming. A large expenditure of time for spectral measurements is often undesired.

Therefore, the further problem to be solved by the present invention is to minimize the time required for the measurements.

The problem is solved by extrapolating densitometrically measured values so as to imitate spectral photometric values.

The method shown in EP 0,228,347 A1 has some further drawbacks. Usually, the use of such a colour matching method requires several correction cycles until the desired colour impression is reached due to the ink corrections.

Therefore, a further objective of the present invention is to suggest a system and a method which allows a faster adjustment of the printing picture than on prior art printing presses.

Advantageously, densitometrically measured values can be the basis for determining an ink composition. The measured densitometric values can be extrapolated in such a way that they provide information as to not measured spectral areas. The quality of the values gained by the aforementioned extrapolation can be checked by a comparison with (generic) spectral photometric values. The respective spectral photometric values gain be gained from time to time and compared with extrapolated values applicable for the same moments of time It is advantageous to use at least two ink mixing devices for the ink correction on a printing press. One of these ink mixing devices can be placed nearer to the printing press than the other one. Moreover at least one of the aforementioned ink mixing apparatuses can be provided with prospective corrective mixtures which have already been mixed in advance.

With regard to the present invention it is useful to make a difference between central mixing devices (generally called ink kitchen or central ink kitchen) and decentralized mixing devices. Usually, a centralized ink mixing device will deliver ink to more printing presses than a decentralized one. A mixing device comprises at least two ink containers containing ink compositions, preferably however basic inks. A mixing device can supply ink components from its containers. This dosing operation can be controlled by weighing the ink bucket. The mixing operation can be accomplished in an ink container like the ink bucket of the printing press or even later by the ink pipe system of the printing press.

A mixing device can also be mobile. In this case, its above mentioned components are moved together with the entire device. If the mixing device is mobile and has several dosing taps and/or gutter-pipes for ink mixtures and basic inks, the ink bucket of a printing press can receive ink from varied dosing tap whereby the mixing device can be moved in such a way that the dosing tap is in a filling up position to the ink bucket.

Decentralized mixing devices can contain fewer basic inks or, more general, fewer ink containers than the centralized mixing devices. Therefore, it is favourable if a decentralized mixing device contains at least 11 basic inks. A further container can contain solvents or blend (ink without chromophore groups/parts). Additionally the central mixing device often also contains decoration inks and the like.

The mobility of a decentralized mixing device can be permitted by movement means such as wheels. A mobile decentralized mixing device can be provided with drives, auxiliary drives and steering or remote steering devices. It can also be equipped as a rail-mounted vehicle.

A preferred decentralized mixing device comprises pumps for transferring ink by means of ink pipes to an ink bucket. After receiving a quantum of corrective ink the bucket contains the corrective ink composition. It is most advantageous if this ink bucket stands on an ink mass determination device, e.g. a scaling or a weighing device, which measures the mass of the corrective ink composition. This scaling device can compute the exact delivery quantity (delivery volume) of the individual ink containers as an additional control for the composition and mass of the corrective ink composition. If the decentralized mixing device comprises dosing means, and if the control device of the decentralized mixing device is connected with the metering unit by a data line, it is possible to monitor the corrective ink quantity in the ink bucket.

A further preferential decentralized mixing device comprises replaceable cartouches of basic ink. The form and the connections of the respective ink cartouches are standardized, so that these can be exchanged quickly. Advantageous decentralized mixing devices comprise a compressed air mechanism. Compressed air can be used to press the basic ink out of the ink cartouches by applying pressure. In addition, compressed air can be used to clean the ink line or pipe system and the decentralized, mixing device (ink pipes) by applying ("free-blowing") compressed air (without ink addition) to the ink pipes.

It is also favourable if the decentralized mixing device comprises an ink analysis device. Such a device can comprise a spectral-photometer and/or a densitometer for receiving optically measured values of the printing substrate. In addition, the ink analysis device includes a control device, which is equipped with an ink correction software or ink formulation software. Thus the decentralized ink mixing device can make a correction on printing machines. Such a decentralized mixing device equipped with all favourable characteristics can also be called mobile ink correction and analysis device.

An ink mass determination device can determine the mass of the ink at least in a part of the ink pipe system. An ink pipe system of a printing press transports the ink from an inlet place to the printing substrate. The ink pipe system usually comprises a bucket-like ink reservoir to which ink is supplied. Furthermore pipes could be part of the ink pipe system. At least a part of the pipes transports ink from the ink reservoir to other ink containers or pipes.

Most ink decks contain ink containers which are often known as ink troughs or doctor blade chambers. Particularly gravure and flexographic printing presses comprise such containers which transport ink to rollers which take part in the printing process.

In flexographic printing presses the ink is often transferred from a doctor blade chamber to an anilox roller which delivers the ink to the printing plate cylinder. The printing plate cylinder transfers the ink to the printing substrate. All aforementioned reservoirs, containers, pipes and rollers which transport ink to the printing substrate are in the following called in their entirety ink pipe system or ink supply system. Therefore, an individual ink pipe system is assigned to each colour of a multicolour printing press.

An exact measurement of the mass or volume of the ink at each printing deck is complicated. However, it is feasible to measure the mass or volume of the ink in the reservoirs and/or containers by weighing the respective member as whole or by a measurement of the volume (fill load of the ink in a reservoir). In most cases, such a measurement will be accomplished with respect to the ink bucket which is essentially the most important ink reservoir. Such a measurement seems to be possible even in an ink tray or in a doctor blade chamber. However, the vibrations of the printing process have to be taken into account in this context. It is favourable to estimate the mass or volume of ink contained in a part of the ink pipe system. The estimation can be based on the overall volume of the respective part of the ink pipe system.

A literal (additional) measurement of the ink mass and/or a measurement of the ink volume (fill level) can be accomplished in the bigger ink reservoirs or containers of the respective ink pipe system. In most cases, the mass or volume of ink in an ink pipe system will be detected on the basis of estimates and measurements. In this way the mass of the ink existing in the ink pipe system (or in parts it) can be identified very exactly with reasonable effort.

These mass or volume values are supplied to the control and evaluating device of a printing press. In view of the data transmitting opportunities which are available for the man skilled in the art, the exact position of the control and evaluating device (on the press or in a certain distance) seems negligible or at least of minor importance. The same notion applies to the position of the hardware which provides for the "intelligence" of the control and evaluation device. In any case, it is important that the device is provided with a preferably electrical or electronic data link to the measurement and control components of the printing press. (At least with the ones mentioned in this printed publication). It is advantageous, if such a link provides for the possibility to control and to exchange data with different functional units of the printing press. In this case the control and evaluation device is deemed to be part of the printing press. The control and evaluation unit can determine the deviation of the optical actual values measured by the optical measuring device and the optical reference values which are stored in the device as light intensity values in a certain wavelength range.

The optical measuring devices can comprise a spectral photometer. Using the data of the spectral photometer an appropriate software is able to calculate a very precise correction recipe or correction formula. Moreover, densitometric measuring values can build the basis for the preparation of a corrective ink composition. These measuring values can be extrapolated in such a way that they permit to give estimations on the light intensity in non measured spectral ranges. From time to time, the quality of the densitometrical measuring values and estimation and/or extrapolation can be checked by means of spectral photometrical measuring values.

Favourable embodiments of control and evaluation devices will convert the optical measuring values determined by the optical measuring devices to colourmetric values at an earlier or later date of the evaluation. The same applies to optical actual values and setpoints.

Colourmetric measuring values are closely related to the visual impression a human viewer gains of the printed image. Hence the deviation of the colour of the printed image can be expressed by a numeric value. The setpoint which should be reached during the printing process can be expressed by means of a "numerical value" (often called "chromaticity coordinate").

Owing to computed deviation of the colour and the weight of the related ink in the press, the device calculates the mass and the composition of the ink to be added in order to reach the required colour modification. In this case, the control and evaluation device knows about the basic inks contained in each ink mixing and weighing device and their influence on the light interacting with the colour printed with these inks.

Favourably, the device does also know the effect of the printing substrate actually handled at the printing press on the remitted light.

By means of a software installed in the control and evaluation device, the required values regarding mass and composition of the ink can be determined. The control device of the printing press is adjusted (i.e. programmed) in such a way that it can determine the composition of the correction ink mixture owing to the optical actual values and the ink mass values which are transmitted to the control device as a signal and/or a data package by the corresponding measuring devices. For this purpose, the control device is equipped with interfaces permitting the control device to transfer data regarding the composition of an ink mixture to a central and/or decentral ink mixing device.

Such computed results (of the control device comprising of the suitable software) acquired on the basis of colourmetrical set points can form the basis of the basic recipe. When determining and using the control recipes, the measurements mentioned before are used for a control operation. During this operation the actual values approach in one or several (iterative) steps to the setpoints.

The determination of the ink mass in the ink circuit or parts of it is very suitable to control how much ink (of the ink mixed according to the basic recipe) is still on the press. At least the part of the overall ink volume which has not yet been transferred to any of the rollers (i.e. the ink in the pipeline, reservoirs and containers) becomes a component of a resulting ink composition. Therefore this part of the ink volume is important for the effect of this ink on the light. Hence, the entire mass measuring endeavour is very important.

The facts mentioned before show that it can be favourable to only measure or estimate the mass of those parts of the overall ink volume which is not yet at the rollers (ink transport rollers like anilox rolls and pressure plate cylinder).

Additionally to the measuring and/or estimation of the ink quantity, the measuring of the viscosity of ink in the ink piping system is favourable. As already mentioned before, the ink consists of several ingredients or components. Most importantly the colour pigments and the solvents (or blend) are to be mentioned. The characteristics of the ink splitting and evaporation differ in all ingredients of the ink (between the different pigments and between the pigments and the solvents) so that their composition is altered during the handling of an ink portion. Generally, the major differences exist between solvents and pigments. So the portion of the solvent in the ink can diminish considerably due to evaporation. This effect has significant influence on the ink density and on the effect of the ink to the light. A measurement of the viscosity does generally permit a suitable conclusion as to the concentration of the ink ingredients in the ink. Therefore, suitable corrective inks can be mixed with higher accuracy. These corrective inks are to be added to the ink volumes on the printing press.

As already mentioned, the steps mentioned above permit the determination or at least the suitable estimation of the quantity and composition of ink which is present on a printing press. On a printing press according to the invention this also applies when the first or already several portions of corrective ink of perhaps different compositions have been added. The monitoring of the ink composition is possible because the control and evaluation device has the relevant information on the quantity and composition of this corrective ink. It can be advantageous to save these information.

By addition of the ink ingredients supplied and still existing on the printing press and perhaps by checking the weight and the viscosity, the control and evaluation device can keep monitoring the mass and composition of the resulting ink.

As a result, it is possible to register and memorize with which ink composition the printing has taken place at which date. Furthermore, this original or resulting ink composition can be put into direct relation to the (at this time) values (actual optical values) measured at the printing substrate.

Thus, the operator can gain something like a protocol of the development of the ink compositions and the individual printing results attained with certain ink compositions.

By the mixing of ink according to the dedicated resulting recipes, the operator can specifically repeat those ink compositions which have led to good results. Therefore, good results can be repeated to a large degree by the same operation. It has to be mentioned that a resulting recipe can be computed by an analysis of the resulting ink composition and that it is favourable to have the suited software installed at the control and evaluation device. As mentioned above, the control and evaluation device "knows" the quantity and composition of the corrective inks, and advantageous control and evaluation devices save them. Thus, the control and evaluation device can—as also mentioned before—keep monitoring and hence controlling the mass and composition of the resulting ink by addition of the added ink compounds. An additional control of the weight and the viscosity has further benefits. As a result the control and evaluation device can allocate assign to measured actual optical values.

From a resulting ink composition at a certain time, the resulting ink recipes can be determined stating how the said resulting ink composition can be "directly" reached (e.g. as basic recipe) by means of an ink composition. So the required chromaticity coordinate can be gained "without detour".

Generally, it is useful to save the used recipes (especially basic recipes, correction recipes). The respective measurements (especially optical, advantageously also mass and viscosity) can be saved, too.

Moreover, it is favourable to repeat several of the measurements mentioned before within certain intervals.

It has already been stated that the use of the knowledge gained on already used recipes (basic recipe, correction recipe, resulting measured optical values) and especially of those recipes leading to the resulting ink compositions can be favourable.

However, alternatively one can proceed as follows:

The deviations of the colour metrical setpoints from the colour metrical actual values which have been recorded under a printing process have also been saved. These values are often named ΔK. The different deviations measured until a satisfying result has been reached are summated and added to the setpoint. By means of the ink mixing software or ink formulation software installed at the control and evaluation device, a basic recipe is prepared which is optimized in order to reach the resulting (sum-)chromaticity coordinate and not the set chromaticity coordinate. The ink produced according to this "bypass recipe" is used for the start up of the printing process.

The procedures mentioned for the use of a resulting ink recipe or the bypass recipe are especially suited if the other process parameters of the different orders (individual print jobs) are mostly constant. These process parameters comprise the following issues:

Same printing press, same anilox roll, same temperature etc.

In the present publication the phrase "method for the operation of a printing press" is used to refer to a process to work off a single print job as well as a method for the sequential work off of several print jobs. As a consequence, the phrase "operation of a printing press" does also comprise the change-over between two print jobs.

If several print jobs should effect the same colour impression and/or the same setpoint (chromaticity coordinate) in a colour space, it is favourable to rely on "experiences" from former print jobs with the same colour setpoint. This finding applies even if two different print jobs to be accomplished by multi colour printing presses have only one colour setpoint in common. Especially the measuring values from these former print jobs belong to useful "experiences". The ink compositions and the respective ink recipes, corrective recipes and the resulting ink recipes can also be mentioned in this context.

Especially with regard to the measuring values, the deviations of the colour metrical actual values from the colour metrical setpoints resulting from former printing jobs are interesting. This notion applies especially with regard to the values gained at the beginning of the printing job, when the control system optimizes the printing picture by adding corrective ink compositions to the ink volumes which are already on the press.

As already mentioned before, it is possible to calculate ink recipes (how do basic colours influence the light) by means of preset colour metrical setpoints as well as by means of information regarding the colour values of the basic colours by means of which the chromaticity coordinate based can be calculated relatively exactly. In order to make such calculations, the control unit of a printing press can be equipped with an ink formulation (calculation) software (ink recipe software). The deviation of a chromaticity coordinate which develops if the ink mix based on the recipe calculated is used for impression setting (at the beginning of the printing job) permits a whole set of conclusions on the calculation method itself and on the process parameters.

Therefore, it is favourable to save the deviation and the process parameters of such printing processes. Especially the deviation is very interesting or significant. If one or more correction cycles are required to reach the desired chromaticity coordinate (colour metrical setpoint of a colour) with sufficient accuracy, the further deviations ($\Delta K_1$, $\Delta K_2$ etc.) are interesting or significant, too. The different deviations can be transferred into the coordinates of a colour space and be summated by vectorial addition to a total deviation (ΔK).

If data on a further (earlier) print job on the same printing machine with at least one equal setpoint (e.c. chromaticity coordinate) is at hand the total deviation (of the earlier printing job) can be deducted from the set point (chromaticity coordinate). Then, the difference chromaticity coordinate ($D=S-\Delta K$) is delivered to the Ink Formulation Software instead of the actual set point chromaticity coordinate.

In case of a measurement of the mass of the ink existing at the printing press it is possible to determine exactly in the way mentioned before which deviation was measured when a certain ink composition was converted by the printing press. It is advantageous, if the control components of a printing press (press operating system etc.) are adjusted in such a way that they can execute the procedure. This adjustment is the result of the installation of software components on the respective hardware components.

Further details and examples are provided by the dependent patent claims and the following description of the figures.

The individual figures show:

FIG. 1A system for the supply of ink compositions

Figure 2:
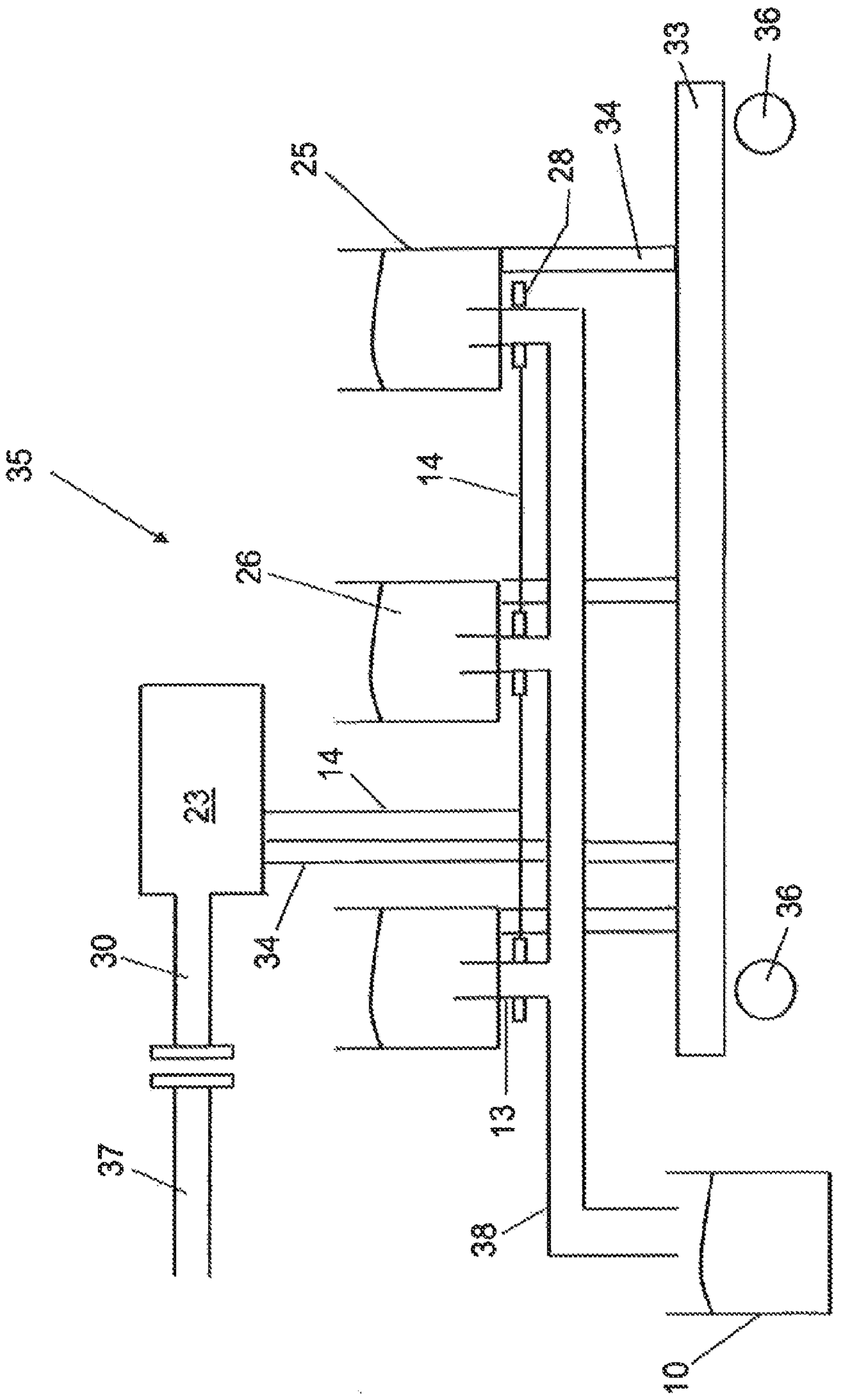

FIG. 2 A mobile (decentral) mixing device

Figure 3:
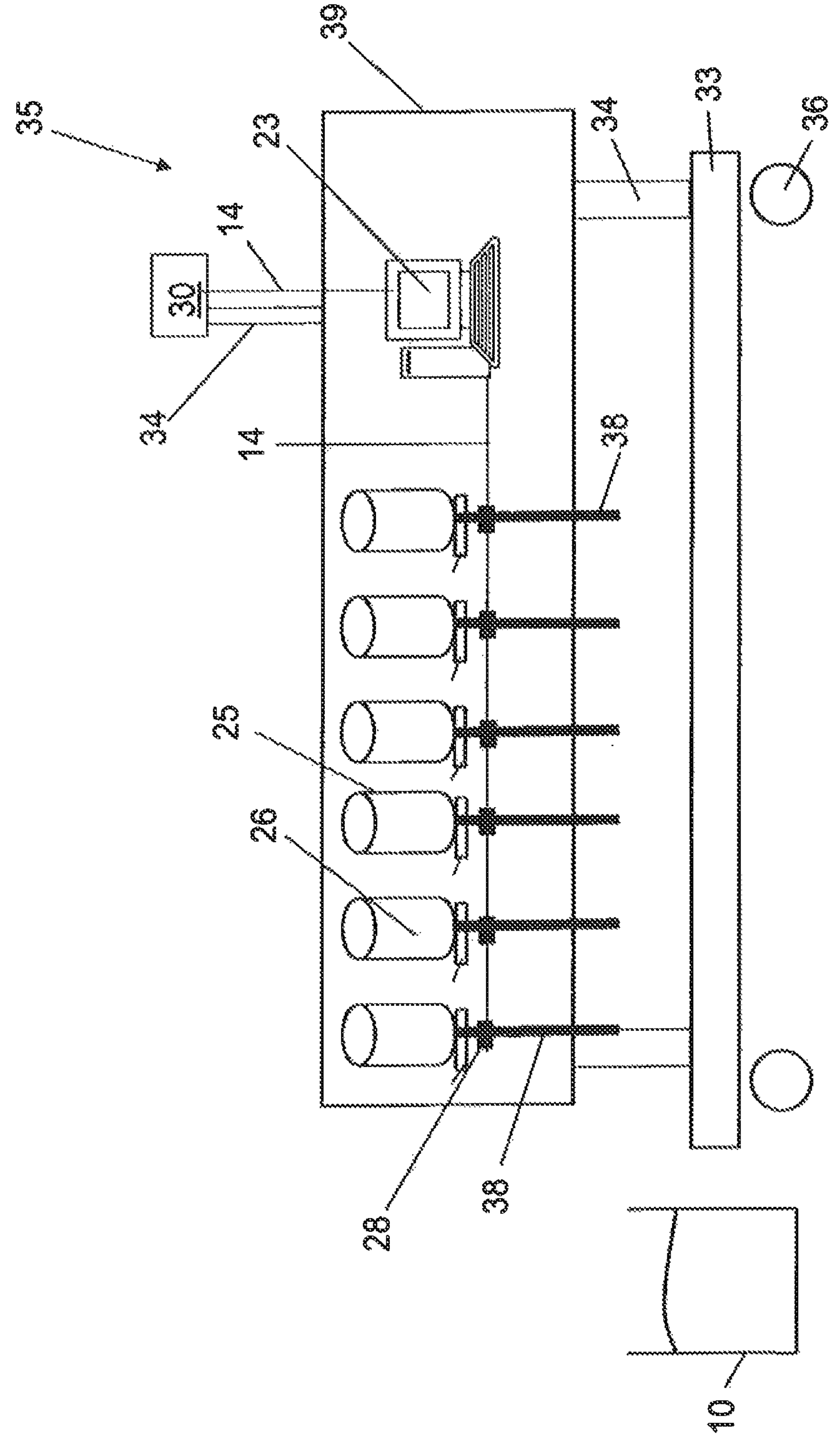

FIG. 3 A further embodiment of the mobile decentral mixing device

Figure 4:
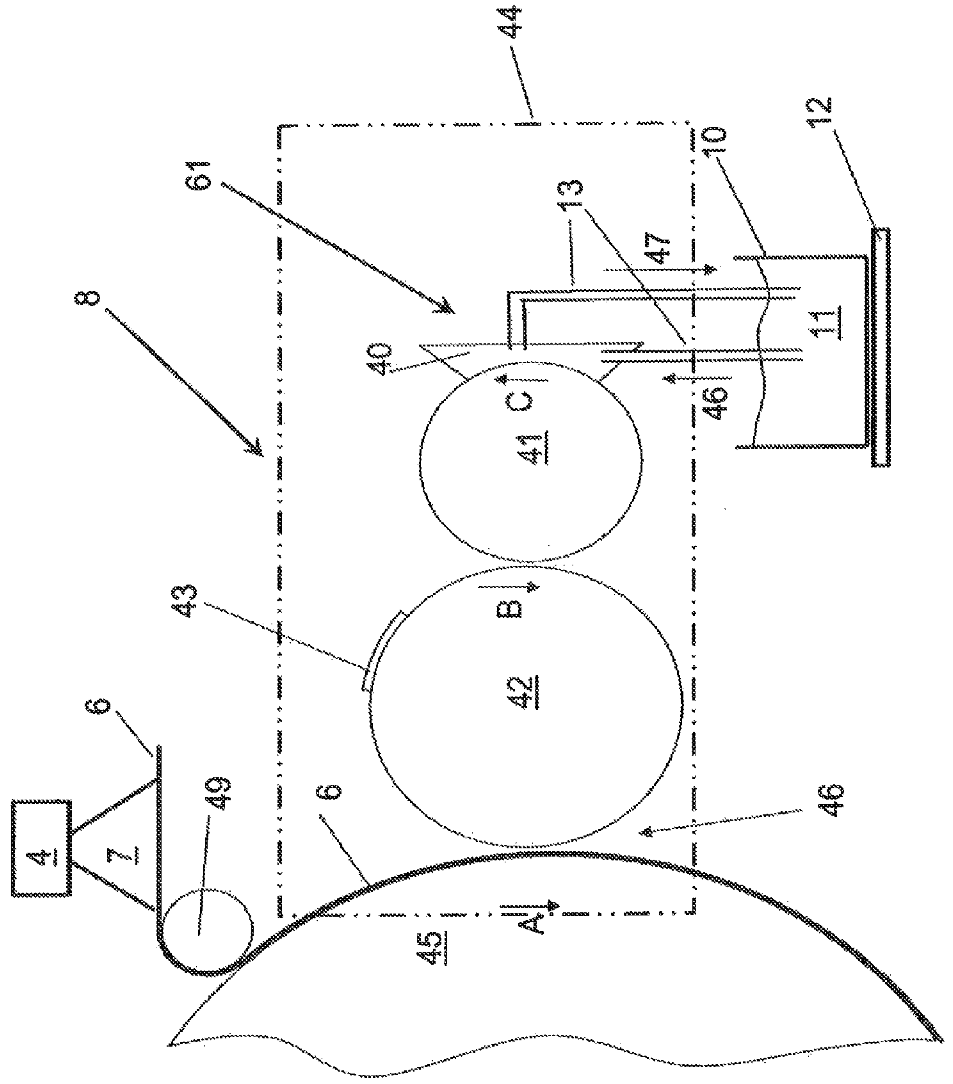

FIG. 4 An colour deck of a central cylinder flexo printing press

Figure 5:
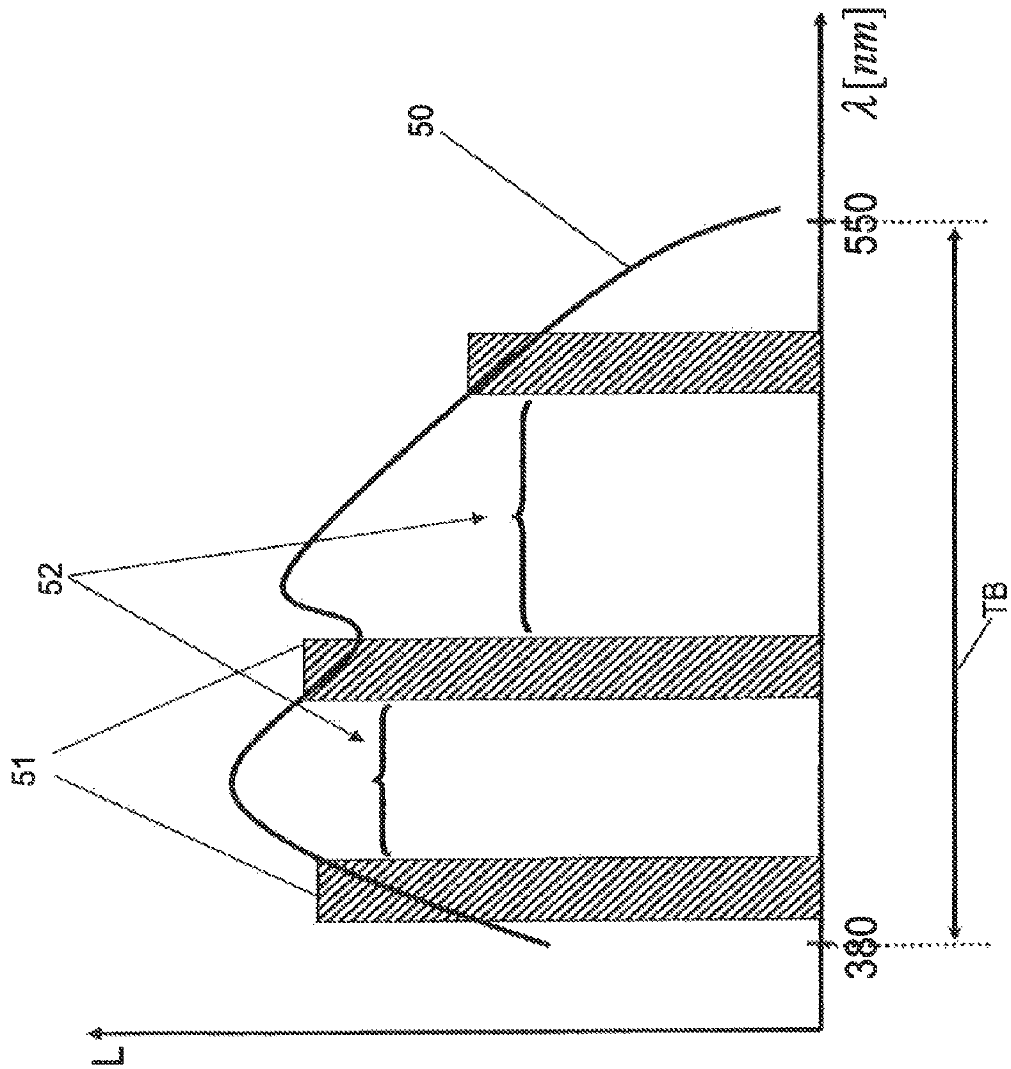

FIG. 5 The distribution of the spectral light intensity of a colour

Figure 6:
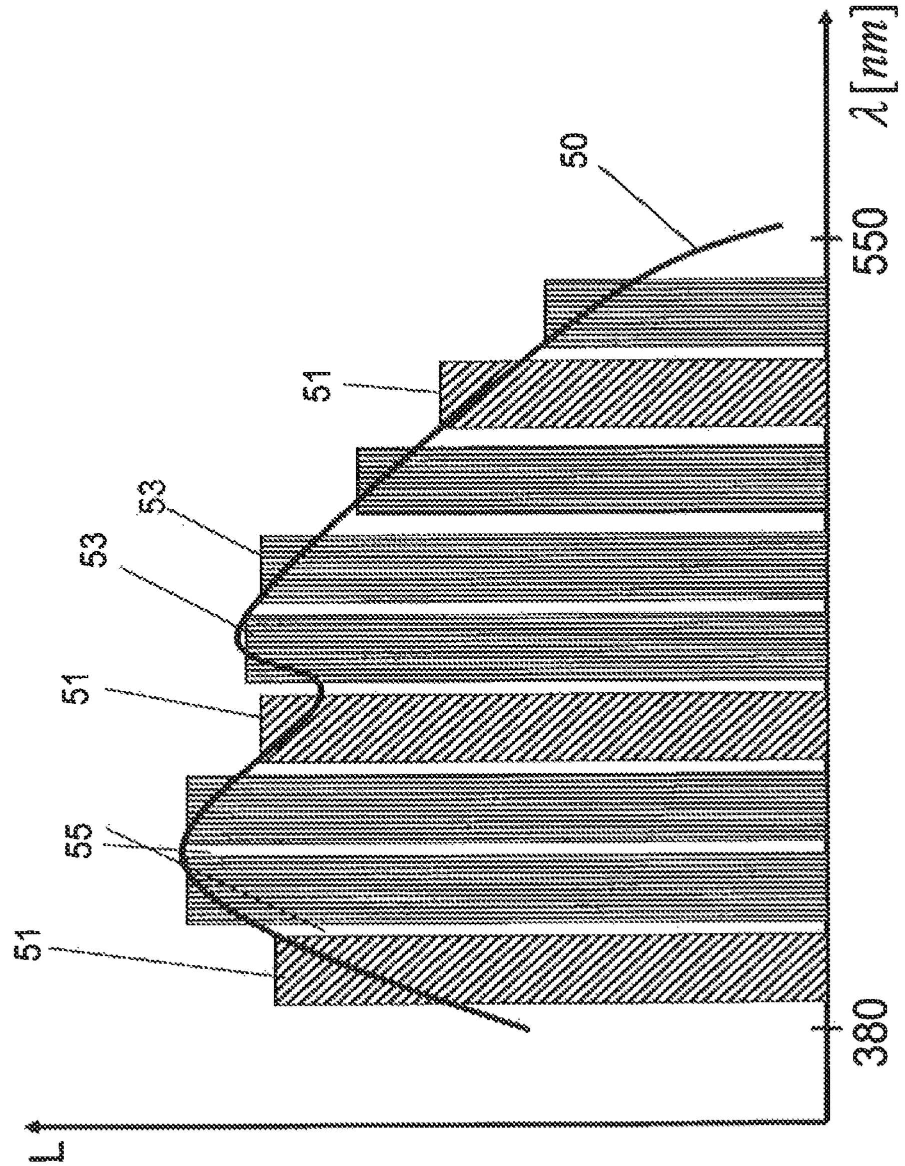

FIG. 6 The distribution of the spectral light intensity of a colour

Figure 7:
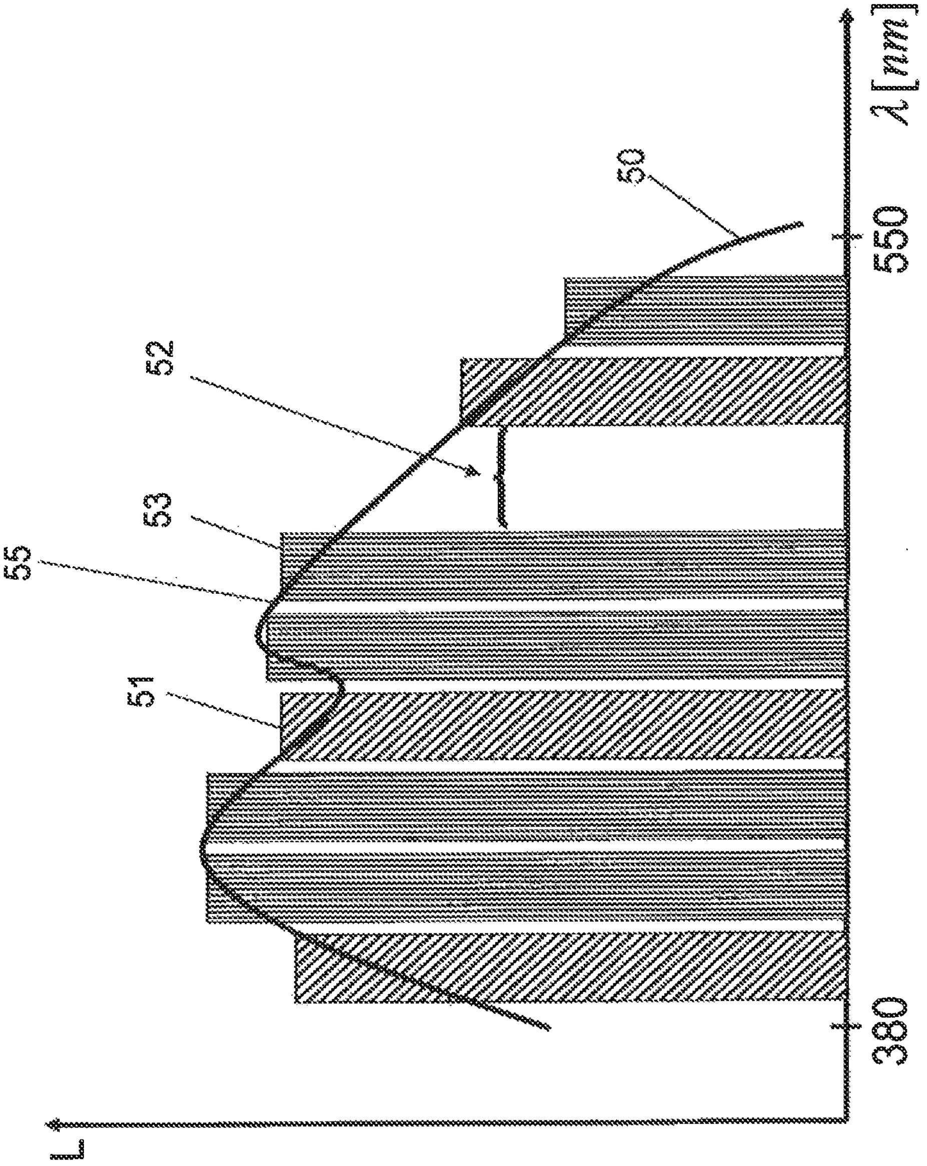

FIG. 7 The distribution of the spectral light intensity of a colour

Figure 8:
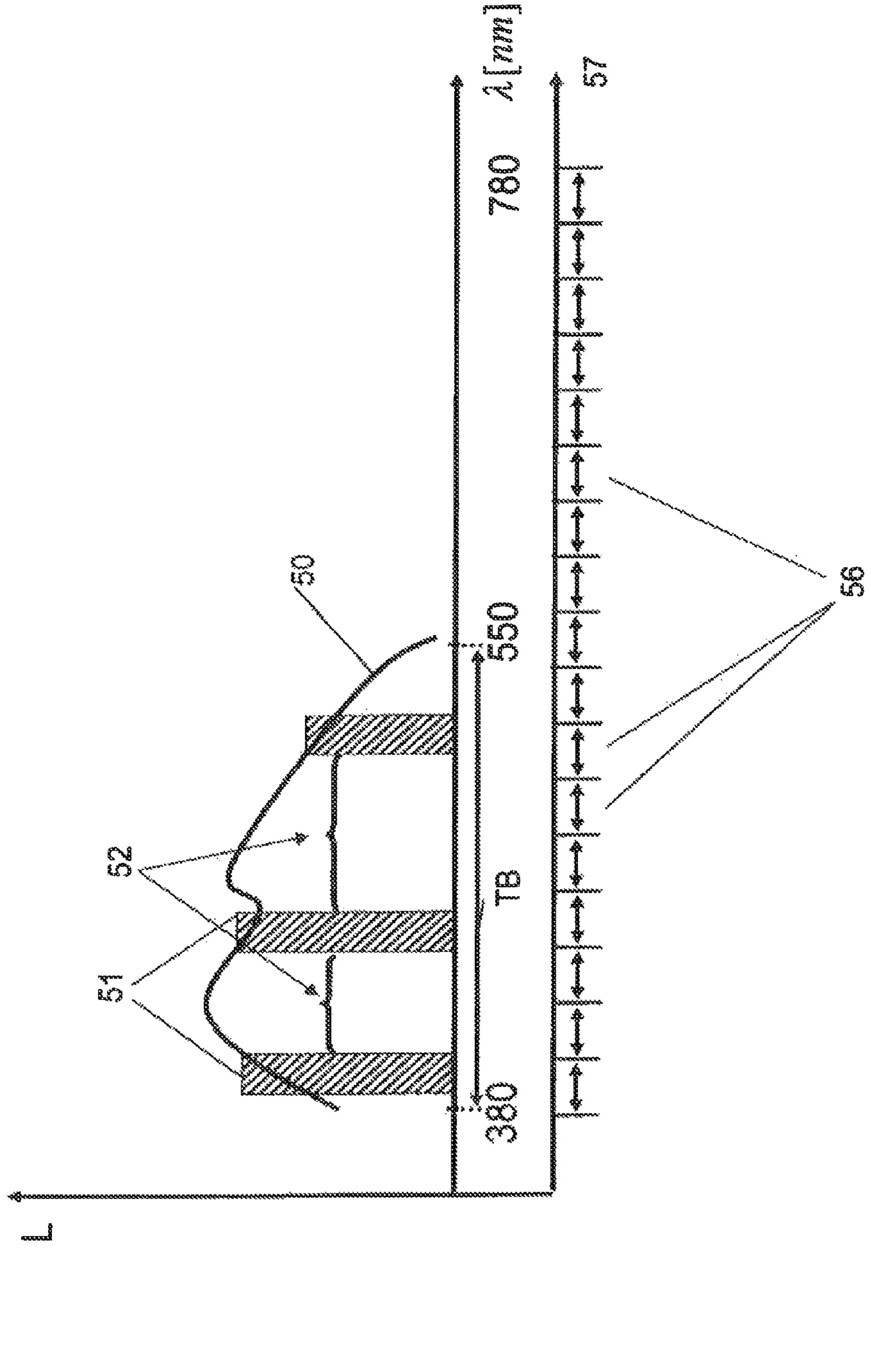

FIG. 8 The distribution of the spectral light intensity of a colour

Figure 9:
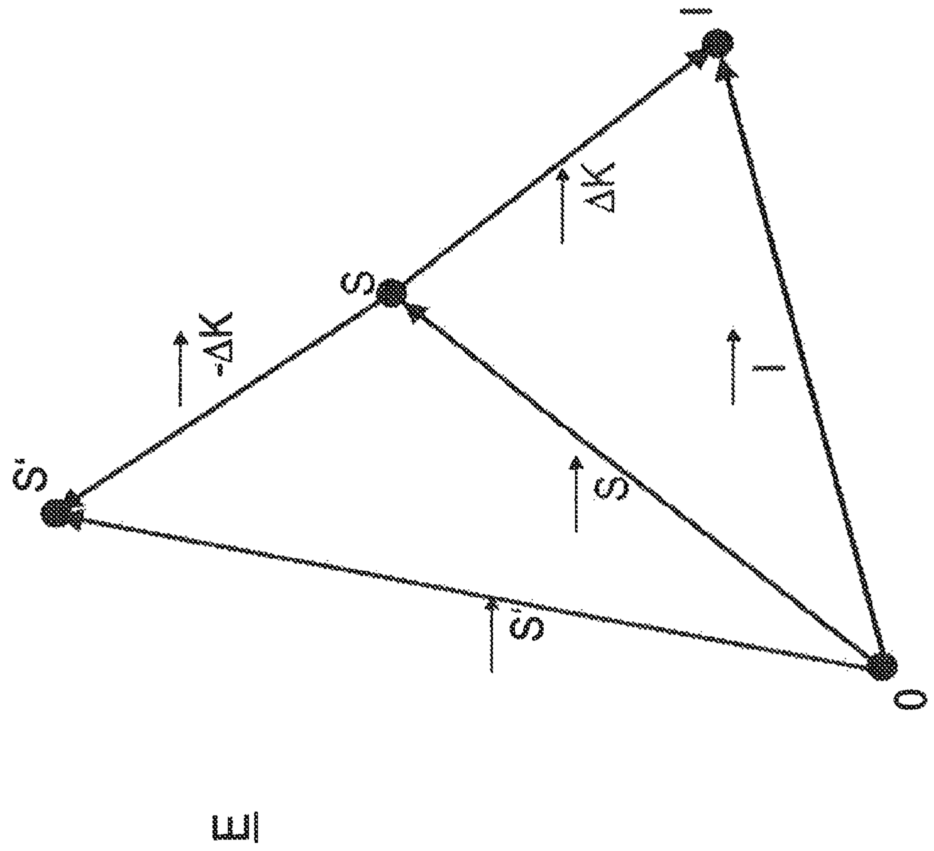

FIG. 9 A vector addition in a colour space E

Figure 10:
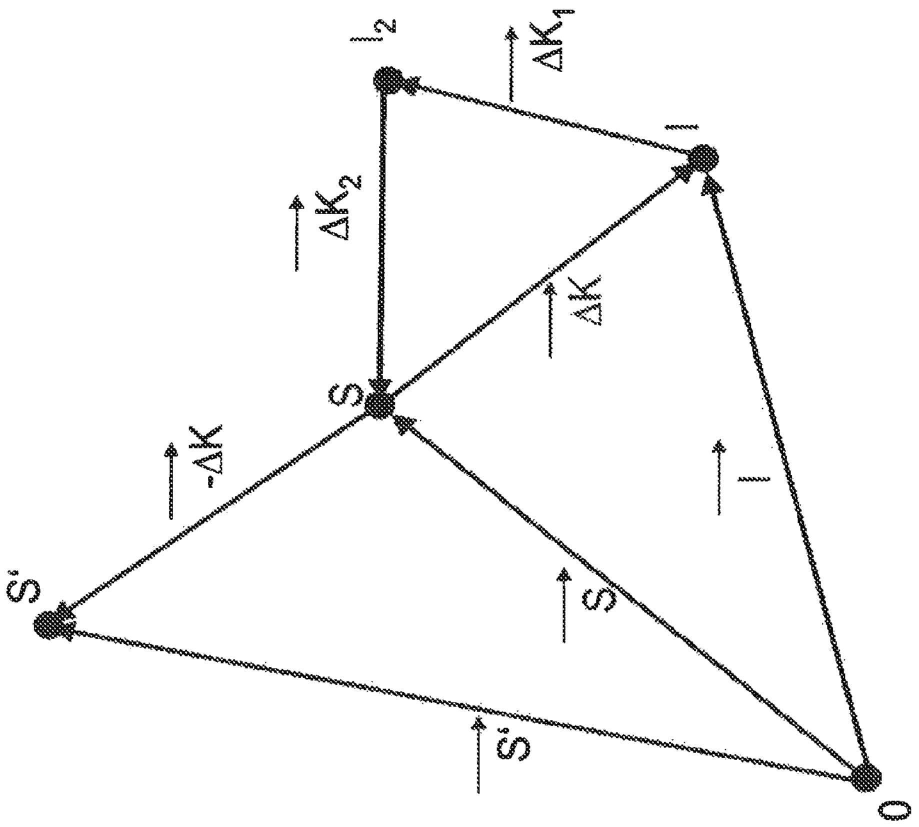
Figure 11:
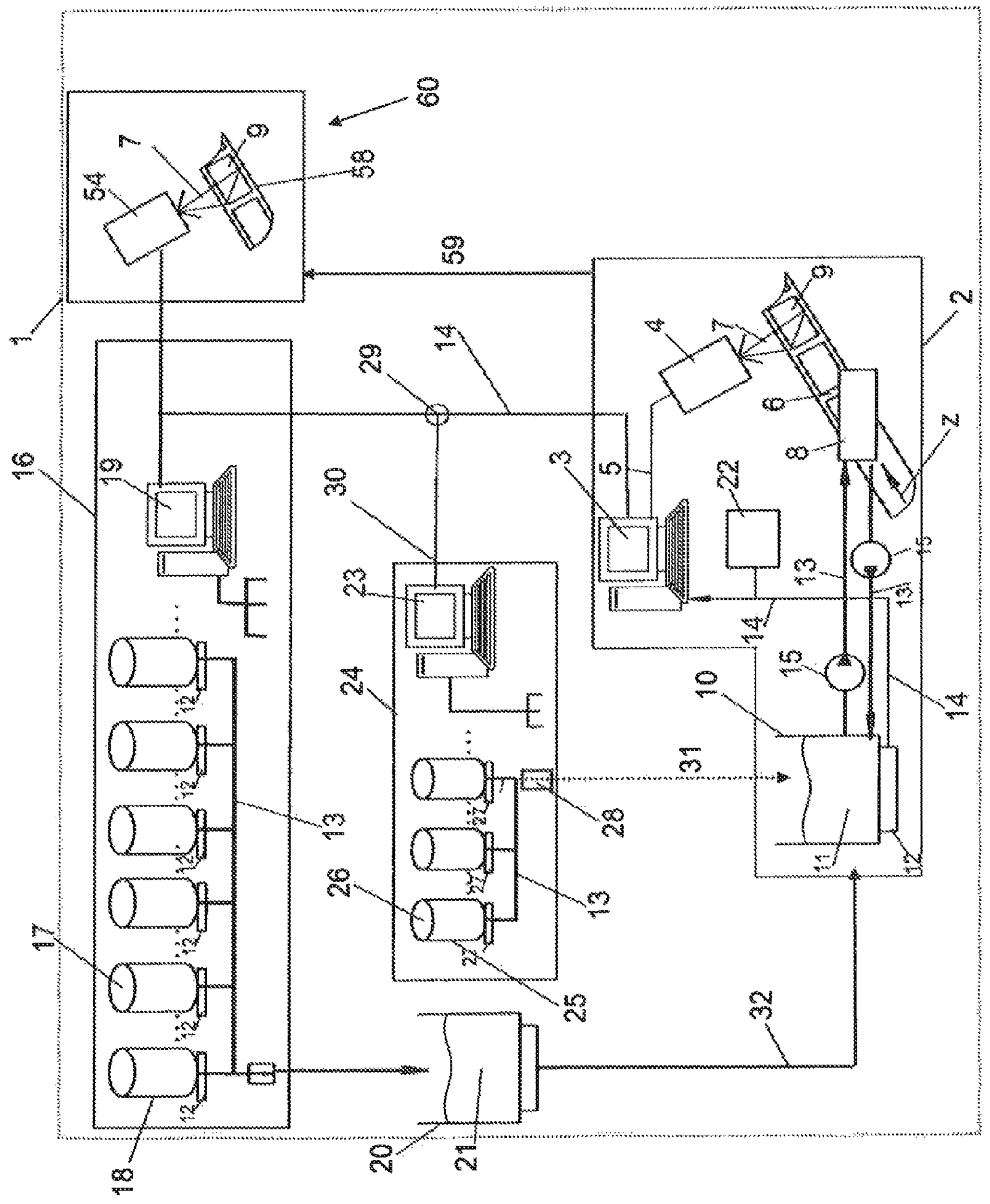
Figure 12:
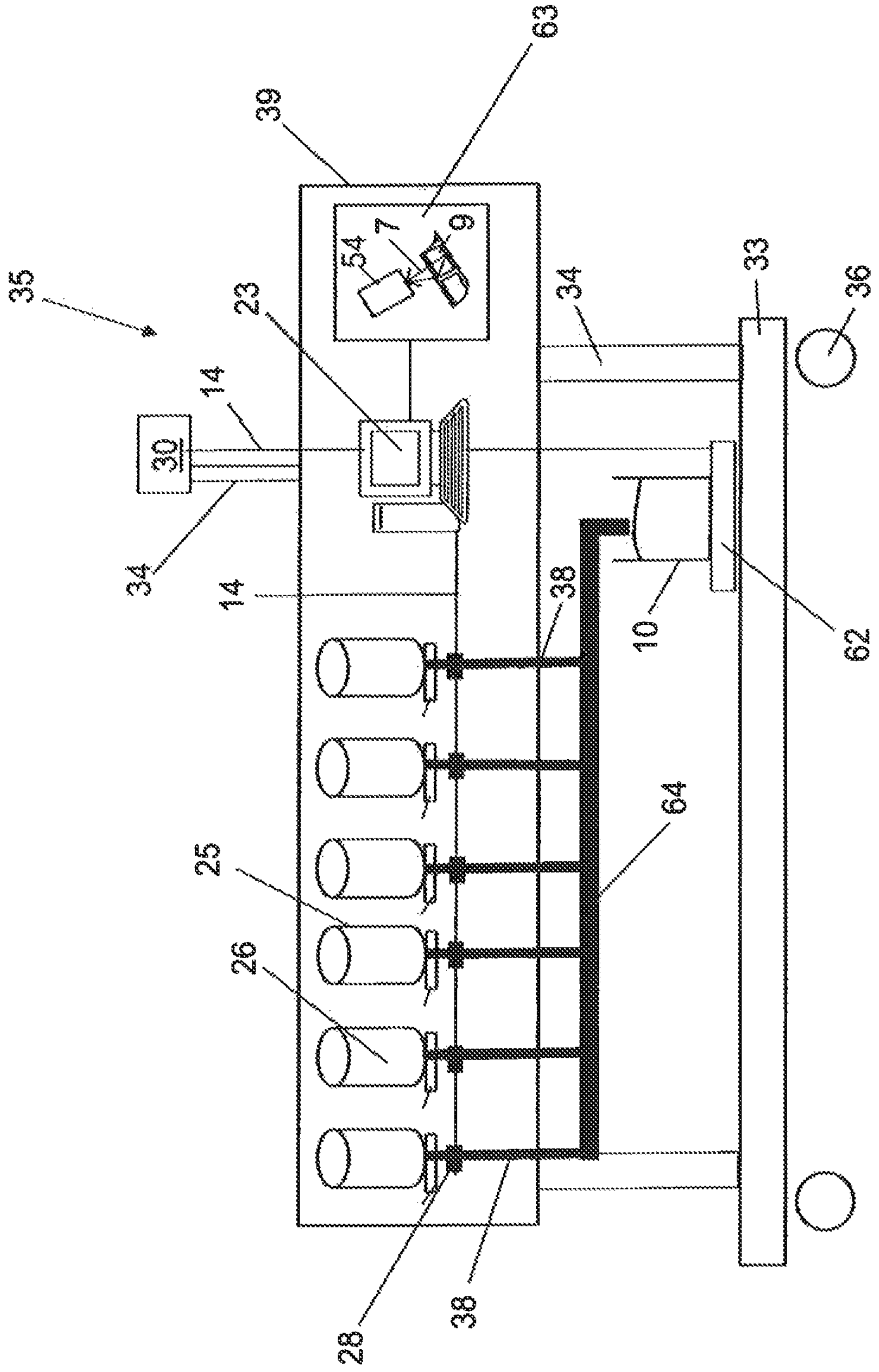

FIG. 10 A vectorial calculation of the set chromaticity coordinates S in the colour space E FIG. 11A further system for the supply of an ink composition FIG. 12 A further embodiment of a mobile local mixing device (colour correction and analysis equipment)

FIG. 1 discloses a system 1 for the supply of an ink composition for printing on a printing substrate 6. System 1 is also fit for a correction of the ink composition if necessary. The respective correction can also be accomplished during the printing operation.

The printing press 2 comprises a control device 3 which is connected via the control line 5 with an optical measuring device 4 which analyses the actual printed image on the printing substrate 6. The cone of light 7 signifies the light reflected by the printing substrate 6 which has interacted with the image on the substrate. Only one colour deck or printing deck 8 of the printing press is shown. Notwithstanding this fact, the printing press 2 can comprise an arbitrary number of colour decks. In case of a plurality of printing decks, there are different methods to check the printing picture by means of the measuring device. First of all special printing marks can be examined. Those marks are printed into distinctive areas of the printing substrate and/or the printing picture. On the other hand, specially chosen areas of the printing picture which are provided with one dominant colour can be checked. However, during the colour-impression setting process it is also possible to check each individual colour sequentially.

The colour deck 8 of the printing press 2 is provided with ink 11 from the ink bucket 10. The weight of the ink bucket 10 can be checked by the weighing device 12. The weighing device can transfer data of the ink mass via the control line or data line 14 to the control device 3. The ink quantity in the rest of the ink supply system of the printing press can be estimated.

The ink lines 13 supply the ink to the colour deck 8. The ink flow is controlled by the ink valves 15.

After the corresponding adjustment of the control device 3 (by an application of a suitable software) it 3 can record the ink mass 11 in the ink bucket 10 continuously. Furthermore, it can record the measuring values of the optical measuring device 4 and allocate the optically recorded measuring values and the mass values to each other. As long as the control device 3 "knows" the composition of the ink within the printing press, it 3 is always able to allocate which ink composition was used when certain colour values in an colour space E were recorded at a certain time.

Additionally the viscosity measurement device 22 has to be mentioned. This device 22 continuously measures the viscosity of the ink at the printing press. Especially in gravure printing and dexo printing machines the relation of the solvents in the ink and the colour pigments may change during the printing process or printing job. This effect can be attributed to different vaporization characteristics of pigments and solvents. Such a development can be observed sufficiently by the measurement of the viscosity as solvents considerably diminish the viscosity in general. If the viscosity measuring device 22 transfers its measuring values to the control device 3 of the printing press 2—or another control device like the control device 19—in some way, the respective control device has values regarding the actual chromaticy coordinate of the colour on the printing substrate 6, the weight of the ink 11 on the press 2 as well as of its 11 viscosity. Due to these measured values, the respective control system knows the ink composition and the quantity of ink within the press.

In general at the beginning of a printing job ink compositions 21 for the diverse colour desks 8 are prepared or mixed in the central ink kitchen. In this central ink kitchen there are inks 17, mainly basic inks which are stored in suitable reservoirs 18. In the embodiments shown these ink reservoirs 18 are equipped with weighing devices 12. Alternatively, the volume of the inks 17 can be measured by means of filling-level meters. The weighing devices 12 and/or filling-level meters can transfer their measuring values to the control device 19 of the central ink kitchen 16 via a control line 14.

This control device 19 controls the composition of the inks. In calculating ink recipes which are the basis of ink compositions operators or control devices strive to reach the chromaticy coordinate (setpoint) as exactly as possible. Based on the information on the actual and desired chromaticy coordinate and on the optical characteristics of the ink in the ink reservoirs 18 of the ink kitchen 16 it is possible to calculate a recipe for corrective ink composition for reaching a certain chromaticy coordinate (setpoint) S. For this purpose, information on the optical characteristics of the printing substrate is favourable. The here mentioned calculation can be accomplished by suitable software programs. This software can be installed on the control unit 19 so that this control unit 19 is adjusted for the calculation of an ink recipe for attaining a colour setpoint S.

As already mentioned, the printing process starts in general with the preparation of a basic ink composition in the central ink kitchen. The ink is mixed according to a basic recipe, which can be calculated for certain chromaticy coordinate setpoints in the manner mentioned before. However, the basic ink compositions can also be defined by the producer of the ink. This basic ink mixture 21 is transported to the printing press 2 in a reservoir 20. Alternatively the ink can be conduced in a pipeline which is not shown. The printing process starts with the basic ink mixture 21.

The printing images 9 are checked by means of the optical measuring device 4. The measuring values often differ from the chromaticy coordinate S by a certain value ΔK. This fact is a considerable drawback. Especially the printing on substrates for packages requires high accuracy in this respect. In this area, the flexo printing and gravure printing presses are the most common printing machines; offset printing presses are also used. Therefore, the printing press 2 can be a gravure-, flexo- or offset printing press.

After computing the deviation ΔK of the actual value of the ink area from the setpoint of the chromaticity coordinate S, it is possible to decide on the corrective measures. The aim is to reach a higher compliance between actual value I and setpoint S. However, this is especially difficult during the continuing printing operation of a print job. The embodiment of the system 1 shown in FIG. 1 is provided with a decentralized ink mixing device 24 in addition to the central ink kitchen 16. The ink kitchen 16 can be allocated to several printing presses of a print office. This ink mixing device 24 can be exclusively allocated to a single printing press. In this case it can be combined or attached to the machine frame of the respective printing press. However, such an ink mixing device can also be designed for the provision of ink and preferably corrective ink for several machines. In order to do this, this unit 24 can be mobile, e.g. the entire unit can be moved on wheels 34.

The decentral ink mixing device 24 comprises preferably 11 reservoirs with so-called primary and/or basic ink and a further reservoir containing solvents.

FIG. 1 shows that the ink mixing device itself 24 contains basic ink for correction 26, ink reservoirs 25, weighing devices 27 as well as ink lines or ink pipes 13 and ink valves 28. In general, the decentral ink mixing device 24 stores smaller ink quantities and a smaller numbers of different ink than the central ink kitchen 16. In this embodiment, a control device 23 is allocated to the decentral ink mixing device 24. This control device 23 can control the ink mixing or ink correction process by means of the decentralized ink mixing unit 24. Therefore the control device 23 can actuate the of the ink valves 28 or other devices of the decentralized ink mixing unit 24. Information regarding the composition and quantity of correction ink can be sent to this control device 23 via the control line 14, the intersection 29 and the interface 30. Based on these information an ink recipe is created, and the decentral ink mixing device 24 provides for a corrective ink mixture for the printing press. This procedure is symbolized by the arrow 31.

The correction ink can again be brought to the printing press by using a movale reservoir. With regard to the basic ink composition 21 this kind of transport is symbolized by the reservoir 20 and the arrow 32. The supply of corrective ink from the decentralized ink mixing device 24 to the printing press is symbolized by the arrow 31. Again, an alternative transportation method could make use of a piping system which is not illustrated. If a mobile decentral mixing device 35 is used the device itself can be brought to the ink buckets 10 of the printing press 2. Then the corrective ink can be directly filled into the ink bucket 10 by means of a discharge tap.

It has to be mentioned that the dots between the colour reservoirs 18 and 25 denote the number of reservoirs 18 und 25 can be bigger than shown in FIG. 1. In general, N basic colours 17 will be available in the central ink kitchen while at least M colours 26 should be stored in a decentral unit.

Moreover, in the central ink kitchen 16 individual pigment reservoirs can be provided which contain pigments for the individual basic inks 17. By a mixing of the pigments of the basic inks with solvents and/or blend and further additives which are not described in detail, basic inks 17 can be produced in the central ink kitchen 16.

Useful information can be exchanged if the control devices 3, 19 and 23 are linked so as to exchange data. Data gained by measurement and/or estimation of the quantity of the ink 11 at the printing press 2, by observation of the ink composition which can be accommodated by optical measurements at the printing substrate 6 and/or by the measurements of its 11 viscosity, enable intelligent devices such as the different control unites 3, 19, and 23 to monitor the composition of ink at a given point in time T before quantities of corrective ink are added to the basic ink.

By addition of a quantity and composition of correction ink known by at least the control device 23 of the decentral ink mixing device 24, the composition of the ink 11 at the press 2 is considerably changed. After the first correction, this composition can be calculated as correct as possible by an addition of the quantities of the individual ink ingredients of the ink 11 at the press 2 and the corrective ink 31.

This method can also be applied after several of such correction steps. Therefore, it is possible to determine relatively correct which ink mixture has generated which colour metrical actual value I after an arbitrary number of correction steps. This information is very useful if follow-up orders for further printing jobs shall be printed with the same or similar colours (to be determined by a comparison of chromaticity coordinates).

FIG. 2 discloses a decentral mobile ink mixing device 35 which could replace the decentral colour mixing unit 24 in FIG. 1. The other reference 35 has been chosen for the mobile ink mixing device to clarify that the ink mixing device 35 is mobile while the ink mixing device 24 in FIG. 1 may be stationary. However, the functional components of the two mixing devices 24 and 35, the ink reservoirs 25, the control line 14, the ink pipe 13, the control device 23, the ink valve 28 and the interface 30 are supplied with the same numerals. The functional components mentioned above are supported by the frame and/or the rack 33 which is movable on the wheels 36. Additionally, the brackets 34 show that the functional components mentioned above are carried by the frame. The decentral mobile unit 35 can be driven from one printing press to printing press and can dispense corrective ink there. Thus, the decentral mobile unit is able to dispense special portions of ink which are stored in diverse ink reservoirs 25, to prepare a corresponding composition of corrective ink and to dispense the ink through the ink lines 13.

The mixing process of the different ink components can take place in a non-shown mixing device of the decentral mobile unit 35. However, the mixing can also take place in the ink bucket 10 of the printing press 2. The control unit 23 receives information regarding the corrective ink required. In the embodiment disclosed in FIG. 2 the data exchange is enabled by connecting the interface 30 of the decentral mobile ink mixing device to the interface 37 of the printing press 2 which receives the corrective ink. Via the aforementioned interfaces, the control device 3 of the printing press 2 informs the control device 23 of the decentral ink mixing device 35 which deviations ΔK of the image on the printing substrate 6 have occurred and which colour composition was used during that time. The control device 23 of the decentral ink mixing device 35 is provided with a "colour recipe software" in such a way that it can calculate the composition and quantity of the colour mixture which can be used for correction. This control unit 23 also "knows" which quantities of corrective inks with which optical characteristics are contained in the reservoirs 25 of the mobile decentral mixing device 35. If a ink for an ink-correction mixture is missing, because it is used up or did never exist from the beginning, the control device 23 sends a corresponding signal.

For the whole closed loop control purpose which is described above, it is favourable to provide also data on optical characteristics of the printing substrate 6 to the control device 23.

The above mentioned paragraphs describe a very "intelligent" control device 23. However, the data links between the control devices 3, 19 and 23 in FIG. 1 show that each of the control devices can be adjusted or programmed for the control of the aforementioned method steps. The precondition is that the respective control device has the necessary hardware capacity and that the data lines 14 between the control devices 3, 19, 23 are designed for a sufficient data transfer. The interfaces 30 and 37 may be Ethernet interfaces. However, it is favourable—especially referring to the mobile decentral unit 35—if necessary information is sent via radio or mobile phone frequencies (like UMTS, WLAN, IR etc.). In the latter case, the control device 23 can be continuously provided with information and the docking of the interfaces 30, 37 is not required.

In most cases, the decentral ink mixing devices 24 and 35 will only provide for corrective ink compositions. However, as an exception they will also provide for a basic ink mixture 21 (e.g. for setting impression). One reason for the use of a decentral ink mixing device 26, 35 is to relieve the central ink kitchen 16.

In view of the conception or definition of the decentral colour mixing devices 24, 35 one has to state that these devices will in any case provide ink quanta. However, there is no absolute need, that an actual mixing procedure of different ink components our of a basic ink composition takes place at these decentral ink mixing devices 24 and 35. There is a possibility that the decentral mixing device provides different ink components which are filled in the ink buckets 10 of the printing presses 2. Hence, the actual mixing procedure would take place in this bucket 10.

Especially with regard to the decentral ink mixing devices 24 and 35 it is advantageous if the reservoirs or ink pipes 13 of the decentral ink mixing devices 24 and 35 are not provided with already mixed corrective ink. The already mixed corrective ink eventually will contaminate the ink compositions for further jobs. Therefore, it is advantageous to arrange the ink line 38 convey also mixed ink in the decentral ink mixing unit 35 in such a way that it can be exchanged or easily cleaned.

In FIG. 3, a further embodiment of a mobile decentral ink mixing unit 35 is disclosed. This unit 35 is provided with ink pipes 38 which are downpipes 38. Each individual downpipe only coveys ink 24 from only one ink reservoir 25. In most cases, eleven ink reservoirs 25 are provided for the basic inks

24 and a further reservoir 25 for the solvents or blend. Each of these downpipes 38 has a ink valve 28 which can be controlled by the control device 23 via the control lines 14. The control device 23 also checks the weight of the inks 26 by means of the weighing equipments 27. The interface 30 is an antenna which is used for radio and/or (mobile phone-) reception. The fixation of the different functional components to the frame 33 is symbolized with the brackets 34 and the mounting plate 39. The mobile unit 35 is moved to the ink bucket 10 of a printing press 2 in such a way that successively one or more downpipes 38 reach their filling position to the ink bucket 10 and the ink quantities are dispensed as calculated by the control unit 23.

A solvent tank can also be part of such a mobile decentral ink mixing unit 35. However, it is advantageous if such a tank is directly at the printing press 2 and if solvent is put into the corresponding ink bucket 10 if the viscosity sinks. In a system like the one shown in FIG. 1 the control unit 3 of the printing press (generally, this teaching is applicable for multi-colour printing presses, therefore, there are often several ink buckets 10 at the printing press 2) can control the ink viscosity and provide a signal to add solvent to the ink when necessary.

In FIG. 4, a colour deck 8 of a central impression cylinder flexo printing press is shown. Machines of this kind are often used in the packaging printing business. They are often provided with eight to twelve of such colour decks 8. The scope of the functional components of the colour deck 8 is indicated by the rectangle 44. The application of the teaching of the present publication to such a central cylinder flexo printing press is advantageous. FIG. 2 shows the ink supply from the ink reservoir which receives the ink from outside of the printing press—in this case the ink bucket 10—to the printing substrate 6.

The ink pipes 13 are connect to the ink bucket 10 and the doctor blade chamber 40. One of the ink pipes transfer ink to the doctor blade chamber (as indicated by arrow 46) and the other one 13 conveys ink from the doctor blade chamber 40 back to the bucket 10 (as indicated by arrow 46). The ink circulation in the ink lines 13 of the printing press from and to the bucket 10 is often called ink circuit. This phase—however—has a certain potential of being misunderstood: The reason is that at least the ink which is printed does never return.

Ink is sent from the doctor blade chamber to the doctor blade 41 which turns in the direction of the arrow C. The doctor blade 41 dispenses the ink to the cliché 43 of the cliché roll 42 which turns into the direction of the arrow B. By means of the clich cliché, the printing substrate 6 is printed while it runs through the printing nip 48 defined by the cliché roll 42 and the impression cylinder 45.

The printing substrate is supplied in the rotating direction A of the impression cylinder, passes the idler roller 49, is lifted by the impression cylinder 45 and checked by the optical measuring device 4. The cone of light 7 represents the light reflected by the print image 9.

For the purpose of weighing or determination of the ink mass and/or the ink volume of the corresponding ink at the printing press FIG. 4 only shows one device: the weighing device 12 controls the weight of the bucket 10. The ink pipes 13 could also be weighed. However, it seems to be more useful to determine their volume and to estimate or to calculate the volume of the ink in the pipes. The doctor blade chamber 40 contains significant ink volumes and could also be weighed. However, owing to the vibrations in the colour deck there is no weighing device so that the moving takes place analogue to the determination of the volumes in the ink lines.

In the broadest sense, the ink at the rollers 41, 42 and/or the cliché also belongs to the ink contained in a ink supply system. However, only a fraction of the ink which once has been on one of the rollers returns to the bucket 10 so that the volume of this ink must not or needs not be considered for the purposes of calculating the ink composition before or after adding corrective ink volumes.

FIGS. 5 and 8 show the distribution of the spectral light intensity of a chosen ink. A special ink or colour mixture generates a characteristic distribution of the spectral intensity of light which has an interaction with the colour and/or with the printing substrate 6 imprinted with the ink. The curve (graph) 50 shows an example of such a sequence or distribution. A colour which causes such a spectral intensity sequence of the reflected light will generate a mainly blue impression to the viewer as the intensity maxima of the curve 50 are within the range 380 to 550 nm.

The FIGS. 5 to 8 disclose the wavelength in nanometer (nm) at the horizontal axis against the light intensity L in arbitrary units on the vertical axis.

The areas 51 represent measuring values in the first chosen wavelength areas. Measuring values in relative discrete areas are caused by using measuring devices with a sensitivity depending on wavelength. Suited or feasible semi-conductor components are known. Often, they are equipped with filters for certain wavelength ranges. In other cases only light from limited wavelength ranges illuminates the surface so that also only reflected light of these wavelength ranges can be measured. FIG. 5 shows that only a part of the spectrum is covered by measurements. This is typical if so-called densitometric measurements are taken. In these cases, light of nine or less of the first chosen wavelength ranges which are of the whole spectral range of the visible light (approx. from 380 to 780 nm) (in FIG. 5 only three in the range between 380 and 550 nm for demonstration) is measured. It is decisive for the definitions provided by this publication that wide areas 52 of the spectrum of the visible light are not examined by these densitometric measurements.

For the purposes of this publication, these areas are also called "second chosen wavelength ranges (52)" or "gaps (52)". They must be distinguished from other wavelength ranges in which the light intensity L is not measured. This is one of the reasons why such measurements are only used for the control of the ink transfer to the printed web according to the state of the art. The thickness of the ink film transferred to the printing substrate can be modified by a modification of the impression of the rollers which take part in the printing process (especially in flexo printing presses), by the adjustment of duct-adjusting screws (offset print) or by the modification of the solvent contents of the ink.

Up to now, a modification of the mixing relation of different colour pigments to each other (in an ink mix 11, which is used in a colour deck 8) owing to such densitometric measuring values is not known. In order to alter or re-adjust this mixing relation of diverse ink pigments to each other (modification of the basic recipe or modification of the ink composition on the press by addition of correction colour), so called spectral photometric measurements are required. FIG. 6 clarifies the nature of such measurements. Additionally to the small number of first chosen spectral areas 51, additionally chosen measuring areas 53 are shown. Sometimes, kinds of chosen ranges overlap the whole range to be measured spreading from 380 to 550 nm. Spectral photometrical measurements, often have no "gaps" 55 or 52 between the chosen ranges 51 and 53. In this case, the gaps 55 in FIG. 6 are only for demonstration.

The spectral sensitivity areas 56 of the channels of a spectral photometer 54 are shown on the lower horizontal axis 57. The continuous string of sensitivity ranges (no gaps between those areas) characterizes such a measurement (FIG. 8). Such spectral sensitivity ranges can be limited to a spectrum of 10 nm allowing conclusions concerning the intensity of the reflected light with the respective resolution. In this case 30 to 40 channels would be required to cover the whole spectral range of the visible light. A semi-conductor sensor (e.c. photodiode)—in some cases provided with an optical filter and/or other optical devices—has to be assigned to each channel. The evaluation of the measuring results requires the handling and processing of huge data quantities. Hence huge calculation capacities are required. Therefore, it is advantageous to extrapolate from densitometric measuring values to spectral photometrical measuring values and to use the values gained by the extrapolation also for the modification and/or correction of the mixing relation of diverse ink pigments to each other in an ink composition or a recipe. With the measuring values I of the light intensity L in the first chosen range 51 at hand, a first favourable step is to extrapolate to a light intensity L in at least one wavelength range 52, 55 in which no measured values have been taken. The extrapolated values are used for correction of the pigment relation in the ink, perhaps together with the measuring values.

This can be executed more reliably if the "normal" sequence or distribution of the spectral light intensity L of an ink or an ink mixture (at least exceeding a wavelength range) which is shown in the figures by the curve 50 is known. Even individual optical values (of very discrete or narrow spectral areas) with respect to the normal distribution of spectral light intensity L may be very useful.

In appropriate cases this process can be successfully used to apply a densitometric measurement which measures the spectral light intensity L—e.g. in only nine primarily chosen areas 51—for the extrapolation of a complete spectral photometrical measurement which is e.g. shown in FIG. 6 (if the gaps 55 are disregarded).

In FIG. 7 there is only one gap 52 within the whole measuring range which extends from 380 to 550 nm. An extrapolation within the range of this gap is also possible.

FIG. 8 clarifies the position of the graph 50 within the whole spectrum of the visible light. Moreover, FIG. 8 shows the lower horizontal axis 57 which shows the continuous succession of the spectral sensitivity areas 56 of a spectral photometer 54.

In the FIGS. 5 and 8 the lucency area or range of the printed ink or colour is shown by the double arrow TB. The colour reflection characteristic of the ink mixture is shown by the graph or curve 50. The graph 50 describes the intensity sequence of the reflected light in the ranges of the spectrum in which the respective ink mixture possesses a detectable degree of reflection. For the operator of a printing press, such a detectable degree of reflection might be a degree of reflection which is still visible for the viewer. As far as such a minimum degree of reflection can be quantified across the whole spectrum of light in a uniform way, it lies beyond 5%, however favourably beyond 2%. Within the lucency range or area TB, the printed ink has a higher reflection degree, i.e. the colour pigment layer transmits more light to and/or through the printing substrate on reflection and/or transmission.

For the purpose of the present publication it has to be kept in mind that an extrapolation of an intensity sequence or distribution of reflected light 7—as shown by means of the graph 50—can also be accomplished by means of a smaller quantity (three in this case) for primary wavelength areas in which the measurement takes place. One example concerns measurements taken with respect to measuring areas 51 outside the lucency range TB of a certain printed ink. For the purpose of correction of the composition of a ink mixture 11 such measuring values can be omitted completely.

FIG. 9 shows the situation in an colour space E. Starting from an origin O, which generally represents the desired colour impression of the printing substrate, a ink mixing software which is installed on a control device 3, 19, 23 calculates an ink recipe which is produced in a ink kitchen 16. By means of this ink composition the operators of the press desire to attain a cromacy coordinate (setpoint) S in a colour space (e.g. LAB, XYZ, LUV, LCH). The control device 3, 19, 23 is provided with relevant information on the colour metrical characteristics of the basic ink and the printing substrate as well as the cromacy coordinate of said setpoint S in a colour space. These information is the basis of the recipe to be prepared. The mentioned ink mixture 21 is used for colour impression setting at the beginning of the printing process. Measured values taken by an optical sensor 4 reveal that the printed web has gained a colour characterized by the actual cromacy coordinate (in spite of using the ink mixture 21). There is a deviation ΔK between the actual cromacy coordinate I and the setpoint S. This deviation is vectorially indicated by the value ΔK. Conventionally the scalar "ΔE" is used which is the norm or magnitude of the vector ΔK in this case. However, the vector ΔK is better suited for the following purposes.

Some time after the above mentioned print job is completed, a further one is going to be executed at the same printing press. Both printing jobs or printing orders require the machine user to produce a printing picture with the same setpoint S with the same colour deck. Advantageously, the ink mixtures 21 as well as the deviation ΔK of the earlier print job have been saved for this purpose.

The following arithmetic examples of the vector diagrams in FIGS. 9 and 10 should be executed in a uniform colour space, e.g. in the LAB colour space. In the present example, the value −ΔK is vectorally added to the set ink area S. This results in the point or vektor S' which presents an auxiliary point in the colour space. It is favourable to indicate the auxiliary point S of the control device 3, 19, 23 as set ink area instead of the setpoint S. Then, the control device 3, 19, 23 calculates a ink recipe which is ascertained to reach the auxiliary point S' but at which the setpoint S can be easily reached.

In more complicated cases several deviations ΔK, $\Delta K_1$, $\Delta K_2$, $\Delta K_3$ can be used in the same way in order to determine the auxiliary ink point S'. The auxiliary point S' can be determined according to the following formula:

$$\overline{S}' = \overline{S} - \Delta\overline{K}$$

$$\Delta\overline{K} = |\Delta\overline{K}| \cdot (\overline{S} - \overline{I})$$

This is shown in FIG. 10.

FIG. 11 shows another example of a system 1 for the preparation of an ink composition—and if necessary for the preparation of corrective ink compositions. FIG. 11 has very much in common with FIG. 1. Therefore the same numerals refer in both figures to the same devices. As a result the following description is confined to an explanation of differences between the figures and/or systems. Unlike FIG. 1, FIG. 11 additionally shows a station 60 for the spectral photometrical examination of components of the printing substrate 6 or the printing picture 9. This station comprises a spectral photometer 54 which analyses parts of the printing substrate 58 and which takes measurements as described with regard to FIGS. 6 and 8.

Usually, the components of the printing substrate are not analysed in an inline process with a spectrometer. This is to say that there is—according to the state of the art—no spectral examination when the printing press 2 is running (=running printing substrate or printed web). In this case an enormous data quantity would arise during a short period of time to ensure a measurement with a certain quality. However, especially in view of the teaching of the present publication it is advantageous to also measure inline (running printing substrate 6, running press 2) with a spectral photometer.

However, in view of the disclosure in the FIGS. 5 to 8, densitometrical measuring values gained by the optical measuring device 4 can be extrapolated so as to replace spectral photometrical measuring values. On this basis, corrective recipes or corrective ink compositions for one of the two mixing devices 16 and 24 can be gained (in fact central ink kitchen 16 and decentral mixing device 24).

In most cases, two control circuits will be formed by the said devices 16 and 24 and the other relevant components of the system 1:

The colour impression setting is effected while using the ink composition 21 prepared in the central ink kitchen 16. The recipe which is the basis of this ink composition 21 can be set forth by the buyer of the printed articles or by the manufacturer of the ink. However, it can also be gained by optically analyzing a first model of the printing picture.

With respect to the analysis of the model the operator should prefer the use of a spectral photometer 54 over a densitometer.

The ink composition 21 which has been prepared according to the recipe is transported to the printing press 2 and filled into the ink bucket 10. The impression setting process is started with this ink composition. (In some printing processes there is no need for impression setting, so in these cases the start up of the normal printing process starts). The resulting ink values are measured on the running printing substrate 6. If the optical measuring equipment 4 is a densitometer, its measuring values are approximated in such a way that the results of the approximation or extrapolation can be reused at least in certain wavelength ranges of the reflected light like spectral photometrical measuring values. The measuring values are approximated in the spectral ranges 52 of the reflected light 7. In these spectral ranges the intensity of light has not been measured. The measured and the extrapolated values are used for the evaluation of the actual ink values. If this actual ink value lies within a target area around the setpoint in the respective (preferably uniform) colour space (which often is disclosed as a circle and/or a ball with a certain radius which has the length $\Delta E_{Set}$), there is no urgent need to stop the printing operation. In any case a corrective colour composition 31 is prepared which is also added to the ink bucket 10. In most cases, this corrective ink composition 31 is prepared by the decentral ink mixing device 16.

In regular or irregular intervals a further additional measurement of the actual ink value I can be taken by the spectral photometer 54. One good way to take such a measurement is to wait for the inevitable exchange of a web storing or web winding roll (or by taking off a sheet in the case of a sheet fed printing press) printing substrate 58 can be retained and investigated in the station 60. Especially in the case that during an offline measurement (the printing substrate 58 is outside of the printing press 2) an area of the printing substrate 58 can be precisely analysed (e.g. by a spectral photometer), so that, the function of the densitometer and the quality of the approximation can be checked.

In FIG. 11, the arrow 59 symbolizes the transport of the printing substrate 58 (which could be a part of a printed web or a single sheet) into the station 60. The spectral photometer 54 is connected to the other intelligent components of the system via the control or data line 14 in a very sophisticated example of such a station. It is also feasible if the spectral photometer is only connected with the control device 19.

FIG. 12 shows a further embodiment of a decentralized mixing device. In FIG. 12 the same or the functionally equivalent components are marked with the same reference signs or numerals as in FIGS. 2 and 3. In FIG. 12 additional, ink lines 64 are provided which transport the basic ink 26 to the ink bucket 10. In order to do this, the ink reservoirs 25 are filled with compressed air which is conducted through a compressed air line which is not shown. The ink bucket 10 is placed onto a weighing device 62. The measured values (weight or mass of the corrective ink 31) are sent to the control device 23 via a suitable data line.

Furthermore, the decentralized mixing device comprises an ink analyzing system 63 which contains an optical measuring equipment 54. The measuring equipment takes optical measuring values of the printing substrate 9 and sends them to the control device 23. An inking mixing device 35 which comprises such an equipment can also be named in its entirety as colour correction- and analysis device. This colour correction- and analysis equipment can accomplish a colour impression correction at printing presses which do not comprise optical measuring equipment for measuring colour values on the printing substrate.

| List of reference signs/numerals | |
|---|---|
| 1 | System for supply of an ink mixture |
| 2 | Printing press |
| 3 | Control and evaluation device |
| 4 | Optical measuring device |
| 5 | Control line, data line |
| 6 | Printing substrate |
| 7 | Cone of light, light |
| 8 | Print work/colour deck |
| 9 | Print image |
| 10 | Ink bucket, ink container, ink repository |
| 11 | Ink |
| 12 | Weighing device, ink mass detection device |
| 13 | Ink line, ink pipe |
| 14 | Control line, data line |
| 15 | Ink valves |
| 16 | (Central) ink kitchen |
| 17 | Ink (basic ink) |
| 18 | Reservoir for the inks 17 |
| 19 | Control device |
| 20 | Reservoir for the basic ink mixture 21 |
| 21 | Basic ink mixture |
| 22 | Viscosity measuring device |
| 23 | Control device of a (decentral) ink mixing device |
| 24 | (Decentral) ink mixing device |
| 25 | Ink reservoir of the (decentral) ink mixing device |
| 26 | Basic ink for correction with a (decentral) ink mixing device 24 |
| 27 | Weighing device of a (decentral) ink mixing device, ink mass determination device |
| 28 | Ink valve of a (decentral) ink mixing device 24 |
| 29 | Intersection |
| 30 | Interface |
| 31 | Arrow "Transport of the correction ink mixture at the printing press"/ Corrective ink |
| 32 | Arrow "Transport of basic ink mixture to the printing press" |
| 33 | Frame of mobile unit |
| 34 | Brackets of mobile unit |
| 35 | Decentral, mobile colour mixing device |
| 36 | Wheels |
| 37 | Interface of the printing press |
| 38 | Downpipes |
| 39 | Mounting plates |
| 40 | Doctor blade chamber |
| 41 | Anilox roll |
| 42 | Cliché roll |

-continued

| List of reference signs/numerals | |
|---|---|
| 43 | Klischee |
| 44 | Rectangle |
| 45 | Impression cylinder |
| 46 | Arrow (ink supply direction) |
| 47 | Arrow (ink supply direction) |
| 48 | Printing nip |
| 49 | Idler roller |
| 50 | Curve/graph, optical values |
| 51 | First chosen areas or first selected ranges |
| 52 | Not measured (wavelength)-areas (“gaps”) or ranges |
| 53 | Additionally chosen measuring ranges |
| 54 | Spectral photometer |
| 55 | (Illustrating) Gap between measuring ranges |
| 56 | Spectral sensitivity range of a “channel” of a spectral photometer |
| 57 | “Lower horizontal axis” |
| 58 | Section of the printing substrate |
| 59 | Arrow “Transport of/Information regarding section of the printing substrate” |
| 60 | Station for spectral photometrical test |
| 61 | Ink supply pipeline, pipe, or piping |
| 62 | Weighing equipment of the decentral ink mixing device |
| 63 | Decentral (mobile) colour analysis device of the decentral ink mixing device |
| 64 | Ink lines of the decentral ink mixing device, ink pipe of the decentral ink mixing device |
| S | Chromaticity coordinate, ink setpoint,, |
| I | Actual colour value |
| S' | Auxiliary colour value |
| K | Correction vector |
| O | Origine |
| TB | Lucent range, transparent area |
| L | Intensity |
| D | chromaticity coordinate |

The invention claimed is:

1. A method of controlling the composition of an ink mixture for at least one printing press, comprising:

obtaining actual optical values (I) of light, whereas the light has interacted at least with parts of the printing picture, which is generated by the printing press on the printing substrate using an ink mixture which is provided by an ink supply system; and due to a deviation of the actual optical value from optical reference values (S), creating a corrective ink mixture, which is added to the ink mixture which is provided by said ink supply system and which changes the ratio of the amounts of ink pigments therein, the ink mixtures used in the method being provided by different ink mixing devices.

2. The method according to claim 1, wherein the first ink mixing device is an ink kitchen, which is used for the supply of ink for a first number (N) of printing presses, the second ink mixing device is a decentralized mixing device, which is used for the supply of ink for a second number (M) of printing presses, and the first number (N) of printing presses is greater than or equal to the second number (M) of printing presses.

3. The method according to claim 2, wherein the second decentralized mixing device, which is used for the supply of ink for the second number (M) of printing presses, is assigned to a single printing press.

4. The method according to claim 1, wherein the composition of the ink mixture is controlled or closed loop controlled for at least two printing presses, and at least one of the ink mixing devices is moved between the at least two printing presses for providing the at least two printing presses with ink mixtures.

5. The method according to claim 1, wherein the ink mixing device, which is moved between at least two printing presses for providing these printing presses with ink mixtures, feeds different ink components to an ink supply system of a colour deck of the printing press and wherein these ink components mix up only within said ink supply system.

6. The method according to claim 1, wherein at least one of the measurements, with which actual optical values (I) are obtained, is a densitometrical measurement, which includes measurements of a light intensity (L) only of first selected wavelength ranges which are part of transparent parts (TB) of the respective ink mixture.

7. The method according to claim 1, wherein estimated values with respect to the light intensities (L) in second selected wave length ranges which differ from the first wavelength ranges and in which the light intensity (L) is not measured are deduced or extrapolated from the densitometric measurement.

8. The method according to claim 7, wherein for said estimation, the optical values are taken into account, which have been the result of prior measurement of light that interacted with the used ink or the used ink components.

9. The method according to claim 7, wherein for said estimation, at least parts of a curve are taken into account, whereas the curve reflects the spectral intensity (L) of the remitted light, that is the result of the interaction of light with the used ink or with the used ink components in a wavelength range.

10. The method according to claim 7, wherein the densitometric measured values underlie the production of a correction mixture.

11. The method according to claim 7, wherein at least one of the measurements to obtain actual optical values (I) is a spectral-photometrical measurement that includes measurement of light intensities (L) in all wavelength ranges of the part of the transparent part of the respective ink mixture.

12. The method according to claim 11, wherein the spectrophotometric measured values are the basis for the production of basic mixtures.

13. The method according to claim 11, wherein the spectrophotometric measured values are taken as a basis for rechecking the quality of at least one of the densitometrical measurement and the estimation.

14. The method according to claim 11, wherein for the supply of said correction mixture, fewer different kinds of basic inks are used than for the production of the basic ink mixture.

15. The method according to claim 11, wherein measurements of the mass of the ink and/or the volume of the ink are performed, and wherein said measurements are taken into account at the creation of the ink mixture using at least one of ink containers of the centralized ink kitchen, ink repositories of at least one printing press, and ink repositories of the decentralized mixing device.

16. The method according to claim 11, wherein measurements of the mass of the ink and/or the volume of the ink are performed, and wherein said measurements are taken into account at the creation of the ink mixture using at least one of ink containers of the centralized ink kitchen, ink repositories of at least one printing press, and ink repositories of the decentralized mixing device.

17. The method according to claim 16, further comprising a control and evaluation device.

18. The method according to claim 17, wherein at least a part of a dosing device of the mixing device is controllable by said control and evaluation device.

19. The method according to claim 18, further comprising interfaces to external control components, which submit data relating to the ink mixtures which are needed by the at least one printing press.

20. A system for controlling a composition of an ink mixture for at least one printing press, comprising:

at least one optical measuring device, which can record actual optical values (l) of light, whereby the recordable light has interacted at least with parts of the printing picture, that is creatable on a printing substrate by at least one printing press using an ink mixture which is provided by an ink supply system of said printing press; and components, with which a corrective ink mixture is creatable on the basis of deviation of the actual optical values (I) from optical reference values (S), whereas said corrective ink mixture can be added to the ink mixture which is provided by the ink supply system in order to change the ratio of the amounts of ink pigments therein, the system including at least two different ink mixing devices, each usable to supply ink mixtures.

* * * * *